US008324826B2

(12) United States Patent
Verberkt et al.

(10) Patent No.: US 8,324,826 B2
(45) Date of Patent: Dec. 4, 2012

(54) METHOD AND DEVICE FOR COMPOSING A LIGHTING ATMOSPHERE FROM AN ABSTRACT DESCRIPTION AND LIGHTING ATMOSPHERE COMPOSITION SYSTEM

(75) Inventors: Mark Henricus Verberkt, Eindhoven (NL); Wolfgang Otto Budde, Aachen (DE); Matthias Wendt, Wuerselen (DE); Volkmar Schulz, Wuerselen (DE); Leon C. A. Van Stuivenberg, Helmond (NL); Dirk Valentinus René Engelen, Heusden-Zolder (BE); Oliver Schreyer, Herzogenrath (DE); Bozena Erdmann, Aachen (DE); Salvador Expedito Boleko, Aachen (DE); Armand Michel Marie Lelkens, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 586 days.

(21) Appl. No.: 12/439,807

(22) PCT Filed: Sep. 19, 2007

(86) PCT No.: PCT/IB2007/053787

§ 371 (c)(1), (2), (4) Date: Dec. 23, 2009

(87) PCT Pub. No.: WO2008/038188

PCT Pub. Date: Apr. 3, 2008

(65) Prior Publication Data

US 2010/0090617 A1 Apr. 15, 2010

(30) Foreign Application Priority Data

Sep. 29, 2006 (EP) .................................... 06121484

(51) Int. Cl.
*G05F 1/00* (2006.01)
*G06F 17/00* (2006.01)

(52) U.S. Cl. ........................................ 315/291; 345/418

(58) Field of Classification Search .................. 315/312, 315/291, 307, 308, 224; 345/204, 418, 428, 345/156, 690, 691, 698, 699, 46, 55, 63, 345/76, 77, 84
See application file for complete search history.

(56) References Cited

U.S. PATENT DOCUMENTS 5,969,485 A 10/1999 Hunt
(Continued)

FOREIGN PATENT DOCUMENTS

GB 2377280 A 1/2003
(Continued)

*Primary Examiner* — Minh D A
(74) *Attorney, Agent, or Firm* — Mark L. Beloborodov

(57) ABSTRACT

The invention relates to composing a lighting atmosphere from an abstract description for example a lighting atmosphere specified in XML, wherein the lighting atmosphere is generated by several lighting devices, by automatically rendering the desired lighting atmosphere from the abstract description. The abstract description describes the type of light with certain lighting parameters desired at certain semantic locations at certain semantic times. This abstract atmosphere description is automatically transferred to a specific instance of a lighting system (14, 16, 18). The invention has the main advantage that it allows to create light scenes and lighting atmospheres at a high level of abstraction without requiring the definition of a lighting atmosphere or scene by setting the intensity, color, etc. for single lighting units or devices which can be very time consuming and cumbersome, particularly with large and complex lighting systems comprising many lighting devices.

3 Claims, 10 Drawing Sheets

U.S. PATENT DOCUMENTS

| | | | | |
|---|---|---|---|---|
| 6,548,967 | B1 * | 4/2003 | Dowling et al. | 315/318 |
| 7,202,613 | B2 * | 4/2007 | Morgan et al. | 315/312 |
| 7,348,736 | B2 * | 3/2008 | Piepgras et al. | 315/291 |
| 7,914,172 | B2 * | 3/2011 | Nagara et al. | 362/231 |
| 8,026,673 | B2 * | 9/2011 | Lys | 315/291 |
| 2005/0116667 | A1 | 6/2005 | Mueller et al. | |
| 2005/0248299 | A1 | 11/2005 | Chemel et al. | |

FOREIGN PATENT DOCUMENTS

| | | | |
|---|---|---|---|
| WO | 02101702 | A2 | 12/2002 |

* cited by examiner

| |
|---|
| FIG. 4A-I |
| FIG. 4A-II |

FIG. 4A

```
<!DOCTYPE atmosphere SYSTEM "atmo.dtd">
<atmosphere name="Summer picture 2" id="18">
        <scene>

<!-- Cash register-->

        <lightelement areaselector="\cash register area" fadeintime="0" fadeouttime="0">
                <lighteffecttype>
                        <ambient intensity="200" colour="0.48,0.6" />
                </lighteffecttype>
        </lightelement>

        <lightelement areaselector="\cash register area" fadeintime="0" fadeouttime="0">
                <lighteffecttype>
                        <accent intensity="2000" colour="0.3,0.3" />
                </lighteffecttype>
        </lightelement>

        <lightelement areaselector="\cash register" fadeintime="0" fadeouttime="0">
                <lighteffecttype>
                        <accent intensity="2000" colour="0.3,0.3" />
                </lighteffecttype>
        </lightelement>
```

FIG. 4A-I

```
<!-- ladies fashion\designer 1-->

    <lightelement areaselector="\ladies fashion\designer 1\clothing rack" fadeintime="0" fadeouttime="0">
        <lighteffecttype>
            <accent intensity="2000" colour="0.3,0.3" />
        </lighteffecttype>
    </lightelement>

    <lightelement areaselector="\ladies fashion\designer 1\mannequin" fadeintime="0" fadeouttime="0">
        <lighteffecttype condition="noperson">
            <accent intensity="5000" colour="0.55,0.4" />
        </lighteffecttype>
    <lighteffecttype condition="personnear">
            <accent intensity="2000" colour="0.3,0.3" />
        </lighteffecttype>
    </lightelement>

    <lightelement areaselector="\ladies fashion\designer 1\wall" fadeintime="0" fadeouttime="0">
        <lighteffecttype>
            <architectural>
                <picturewallwash pngfile="summer_2_left.png"  intensity="2000"/>
            </architectural>
        </lighteffecttype>
    </lightelement>
```

FIG. 4A-II

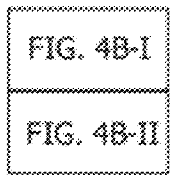

FIG. 4B

```
<lightelement areaselector="\ladies fashion\designer 2\clothing rack" fadeintime="0" fadeouttime="0">
        <lighteffecttype>
                <accent intensity="500" colour="0.3,0.3" />
        </lighteffecttype>
</lightelement>


<!-- ladies fashion\designer label 3-->

<lightelement areaselector="\ladies fashion\designer 3\clothing rack" fadeintime="0" fadeouttime="0">
        <lighteffecttype>
                <accent intensity="2000" colour="0.3,0.3" />
        </lighteffecttype>
</lightelement>
```

FIG. 4B-I

```
<lightelement areaselector="\ladies fashion\designer 3\wall" fadeintime="0" fadeouttime="0">
          <lighteffecttype>
                    <architectural>
                              <wallwash intensity="1500" colour="0.2, 0.05/>
                    </architectural>
          </lighteffecttype>
</lightelement>

<lightelement areaselector="\ladies fashion\designer 3\mannequin" fadeintime="0" fadeouttime="0">
          <lighteffecttype condition="noperson">
                    <accent intensity="5000" colour="0.55,0.4" />
          </lighteffecttype>
<lighteffecttype condition="personnear">
                    <accent intensity="2000" colour="0.3,0.3" />
          </lighteffecttype>
</lightelement>
```

FIG. 4B-II

| |
|---|
| FIG. 4C-I |
| FIG. 4C-II |

FIG. 4C

```
<!--discount-->

    <lightelement areaselector="\discount" fadeintime="0" fadeouttime="0">
            <lightdistribution coordinatesystem="3D" intensity="500">
                    <shape type="square">
                            <vertex x="-0.5" y=" 0.5" />
                            <vertex x="-0.5" y="-0.5" />
                            <vertex x=" 0.5" y="-0.5" />
                            <vertex x=" 0.5" y=" 0.5" />
                    </shape>
                    <colourpoints>
                            <colour colour="0.2,0.15" />
                            <colour colour="0.3,0.2" />
                            <colour colour="0.4,0.3" />
                            <colour colour="0.5,0.4" />
                    </colourpoints>
                </lightdistribution>
    </lightelement>
```

FIG. 4C-I

```
    <lightelement areaselector="\discount\ladies fashion\wall" fadeintime="0" fadeouttime="0">
            <lighteffecttype>
                    <architectural>
                            <picturewallwash pngfile="picturewallwashdiscount.png"   intensity="3500"/>
                    </architectural>
            </lighteffecttype>
    </lightelement>

    <lightelement areaselector="\discount\ladies fashion\mannequin" fadeintime="0" fadeouttime="0">
            <lighteffecttype condition="noperson">
                    <accent intensity="3000" colour="0.5,0.3" />
            </lighteffecttype>
            <lighteffecttype condition="personnear">
                    <accent intensity="3000" colour="0.3,0.3" />
            </lighteffecttype>
    </lightelement>

    </scene>
</atmosphere>
```

FIG. 4C-II

METHOD AND DEVICE FOR COMPOSING A LIGHTING ATMOSPHERE FROM AN ABSTRACT DESCRIPTION AND LIGHTING ATMOSPHERE COMPOSITION SYSTEM

This application is a national stage application under 35 U.S.C. §371 of International Application No. PCT/IB2007/053787 filed on Sep. 19, 2007, and published in the English language on Mar. 4, 2008 as International Publication No. WO/2008/038188, which claims priority to European Application No. 06121484.7, filed on Sep. 29, 2006, incorporated herein by reference.

The invention relates to composing a lighting atmosphere from an abstract description for example a lighting atmosphere specified in XML (Extensible Markup Language), wherein the lighting atmosphere is generated by several lighting devices, by automatically rendering the desired lighting atmosphere from the abstract description.

In order to create a certain atmosphere in a room, lighting is an essential aspect. Thus, sophisticated lighting systems become more and more important for creating certain atmospheres or scenes even in everyday situations or homes. This kind of lighting is also called effect lighting because several lighting parameters such as intensity and colors are controlled for composing a certain lighting atmosphere or scene. Lighting systems for effect lighting can already be found in shops, hotel lobbies, hotel rooms, restaurants etc. These lighting systems consist of a relatively large number of light units or lighting devices, for example hundreds or even thousands of LEDs (Light Emitting Diodes) or light sources of different technologies such as fluorescent, incandescent (halogen) light sources, that together are used to create a certain lighting atmosphere in the room that they are applied to. In current lighting systems for effect lighting, light scenes or atmospheres are created by determining for each individual light unit/group of light units the intensity, color etc. of that light unit/group of light units. Because of the amount of light units, this is a very time consuming and thus expensive task. This is even worse in case of dynamic scenes or atmospheres that change over time. In this case, for every situation or point in time, the intensity, color etc. of every light unit will have to be determined or programmed.

US 2005/0248299 A1 discloses a light system manager, a light show composer, a light system engine, and related facilities for the convenient authoring and execution of lighting shows using semiconductor-based illumination units, particularly for illumination units with many lighting devices. According to an embodiment of the invention disclosed in US 2005/0248299 A1, lighting shows may be created with an authoring computer executing the light show composer. The created lighting shows may be compiled into simple scripts that are embodied as XML documents which may be transmitted to a light systems engine which controls the lighting devices or units. Using XML documents to transmit lighting shows allows the combination of lighting shows with other types of programming instructions, for example for another computer system such as a sound system. In order to make it easier for a user to create a lighting show using a plurality of lighting systems, a mapping facility of the light system manager may be provided for mapping locations of a plurality of light systems. Particularly, the mapping facility may include a graphical user interface which assists a user in mapping lighting units to locations.

It is an object of the present invention to provide an improved method, device and system for composing a lighting atmosphere.

In order to achieve the object defined above, the invention provides a method for composing a lighting atmosphere from an abstract atmosphere description, wherein the method comprises the following characteristic features:

providing the abstract atmosphere description of the lighting atmosphere by describing the type of light with certain lighting parameters desired at certain semantic locations at certain semantic times, and transferring the abstract atmosphere description to a specific instance of a lighting system.

In order to achieve the object defined above, the invention further provides a device for composing a lighting atmosphere from an abstract atmosphere description, wherein the device comprises the following characteristic features: means for providing the abstract atmosphere description of the lighting atmosphere by describing the type of light with certain lighting parameters desired at certain semantic locations at certain semantic times, and means for transferring the abstract atmosphere description to a specific instance of a lighting system.

The characteristic features according to the invention provide the advantage that a lighting atmosphere may be described in an abstract way, i.e., independent from a concrete instance of a lighting system or a room. In other words, the abstract description is room and lighting infrastructure independent, thus enabling to use only one description of a certain lighting atmosphere which may then be transferred to many different specific instances of lighting systems or rooms. A lighting atmosphere designer is therefore freed from the cumbersome and expensive work of adjusting a specific instance of a lighting system for obtaining a desired lighting atmosphere.

The term "lighting atmosphere" as used herein means a spatial and temporal distribution in a specific room of different lighting parameters such as intensities of different spectral components of a lighting, the colors or spectral components contained in a lighting, the color gradient, the directionality of the lighting or the like.

The term "abstract atmosphere description" of a lighting atmosphere means a description of the atmosphere at a higher level of abstraction than a description of settings of the intensity, color or like of every individual lighting device or unit of a lighting system. It means for example the description of the type of a lighting such as "diffuse ambient lighting", "focused accent lighting", or "wall washing" and the description of certain lighting parameters such as the intensity, color, or color gradient at certain semantic locations at certain semantic times, for example "blue with low intensity in the morning at the cash register" or "dark red with medium intensity at dinner time in the whole shopping area".

The terms "semantic location" and "semantic time" mean a description of a location or time such a "cash register" in a shop or "lunch time" in contrast to a concrete description of a location with coordinates or of a time with an exact expression of time.

It should be understood that the abstract description of a lighting atmosphere does not comprise concrete information about a specific instance of a lighting system such as the number and locations of the used lighting units or devices and their colors and available intensities. It will be better understood from the description of a concrete embodiment of the invention in XML what is exactly meant by an abstract atmosphere description.

The term "specific instance of a lighting system" means a concrete implementation of a lighting system in a specific room, for example a specific instance of a lighting system applied to a certain shop, hotel lobby, or restaurant.

The term "transferring" as used herein means an automatic process of transferring the abstract description to the specific lighting system instance as it is typically performed by a complex algorithm implemented by a computer program or by specific hardware implementing the invention. Due to the complexity of modern lighting systems applying a plurality of lighting units or devices, an automatic process of transferring an abstract lighting description is required as it is provided by the invention since manually transferring would be too expensive.

The term "lighting system" comprises a complex system for illumination, particularly containing several lighting units, for example a plurality of LEDs (light emitting diodes) or other lighting devices such as halogen bulbs. Typically, such a lighting system applies several tens to hundreds of these lighting devices so that the composition of a certain lighting atmosphere by individually controlling the characteristics of each single lighting device would require a computerized lighting control equipment.

According to an embodiment of the invention, the transferring of the abstract atmosphere description to a specific instance of a lighting system may comprise compiling the abstract atmosphere description into an atmosphere model comprising a room layout dependent description. This description is still lighting infrastructure independent.

According to a further embodiment of the invention, the compiling may comprise replacing the certain semantic locations in the abstract description with physical locations in the room.

According to a yet further embodiment of the invention, the compiling may comprise replacing the certain semantic times in the abstract description with actual times.

According to a yet further embodiment of the invention, the compiling comprises replacing any semantic sensors in the abstract description with real sensors located in the room.

According to an embodiment of the invention, the method may further comprise the step of rendering the atmosphere model to a target by removing of dynamics, time and sensor dependencies from the atmosphere model and creating a snapshot of the lighting atmosphere at a certain point in time and given sensor readings at the certain point in time.

According to a further embodiment of the invention, the method may comprise mapping the target into actual control values for lighting devices of the specific instance of a lighting system.

According to a yet further embodiment of the invention, the mapping may comprise receiving parameters of the lighting devices and contributions of the lighting devices to a lighting at a certain physical location, and calculating the actual control values for the lighting devices based on the received parameters and contributions and the target.

According to an embodiment of the invention, the mapping may further comprise receiving sensor values, and controlling the lighting devices with a closed feedback loop based on the received sensor values.

According to an alternative embodiment of the invention, the mapping may further comprise receiving sensor values, and controlling the lighting devices with a open loop control based on the received sensor values.

According to a yet further embodiment of the invention, the mapping step may control the lighting devices by executing a classical optimization, a neural network, or a genetic algorithm.

According to an embodiment of the invention, the method may further comprise the following step:

calibrating the lighting system before transferring the abstract atmosphere description to a specific instance of a lighting system.

According to a further embodiment of the invention, the calibrating may comprise the following steps:

deactivating all lighting devices, measuring the present lighting effects and storing the measurement values as dark light values, activating lighting devices of the lighting system one by one by using a representative set of control values for the lighting devices, waiting until the light effect of each activated lighting device is stable, measuring the effect of each lighting device at several different physical locations, calculating for every lighting device the lighting effect on the environment by subtracting the stored dark light values from the measurement values of the effect of each lighting device, and storing the calculated lighting effect together with the corresponding control values for each lighting device.

According to a further embodiment of the invention, a computer program is provided, wherein the computer program may be enabled to carry out the method according to the invention when executed by a computer.

According to an embodiment of the invention, a record carrier such as a CD-ROM, DVD, memory card, floppy disk or similar storage medium may be provided for storing a computer program according to the invention.

A further embodiment of the invention provides a computer which may be programmed to perform a method according to the invention and may comprise an interface for communication with a lighting system. The communication may be for example performed over wire line or wireless communication connections between the interface and the lighting system. In case of wireless communication connections, the interface may comprise a radio frequency (RF) communication module such as a WLAN and/or Bluetooth® and/or ZigBee module which may establish a communication connections with respective counterparts of the lighting system.

According to an embodiment of the invention, a lighting atmosphere composition system may comprise a computer as specified above and receiving means adapted for receiving an abstract atmosphere description which is processed by the computer.

According to a further embodiment of the invention, the receiving means may be further adapted to receive the abstract atmosphere description over a computer network, particularly the internet.

According to a yet further embodiment of the invention, the receiving means may be adapted to automatically log into a remote computer and to download the abstract atmosphere description from the remote computer.

According to a yet further embodiment of the invention, the receiving means may be adapted to allow a login from a remote computer for uploading the abstract atmosphere description from the remote computer to the receiving means.

According to an embodiment of the device for composing a lighting atmosphere from an abstract atmosphere description according to the invention, the transferring means may be adapted to perform a method according to the invention.

According to a further embodiment of the invention, the device for composing a lighting atmosphere from an abstract atmosphere description may be adapted for calibrating the lighting system before transferring the abstract atmosphere description to a specific instance of a lighting system.

According to an embodiment of the invention, the device for composing a lighting atmosphere from an abstract atmosphere description may be further adapted for calibrating the lighting system according to the method according to the invention and as specified above.

According to a further embodiment of the invention, a lighting atmosphere composition compiling module for usage with a method, system or device of the invention, wherein the module is adapted for compiling an abstract atmosphere description into an atmosphere model comprising a room layout dependent description.

According to a further embodiment of the invention, a lighting atmosphere composition rendering module for usage with a method, system or device of the invention may be provided, wherein the module is adapted for rendering an atmosphere model to a target by removing of dynamics, time and sensor dependencies from the atmosphere model and creating a snapshot of the lighting atmosphere at a certain point in time and given sensor readings at the certain point in time.

According to a further embodiment of the invention, a lighting atmosphere composition mapping module for usage with a method, system or device of the invention may be provided, wherein the module is adapted for mapping a target into actual control values for lighting devices of a specific instance of a lighting system.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

FIG. 4A to 4C shows a XML file as an embodiment of an abstract atmosphere description according to the invention, wherein the file contains an abstract description of a lighting atmosphere in a shop;

Figure 1:
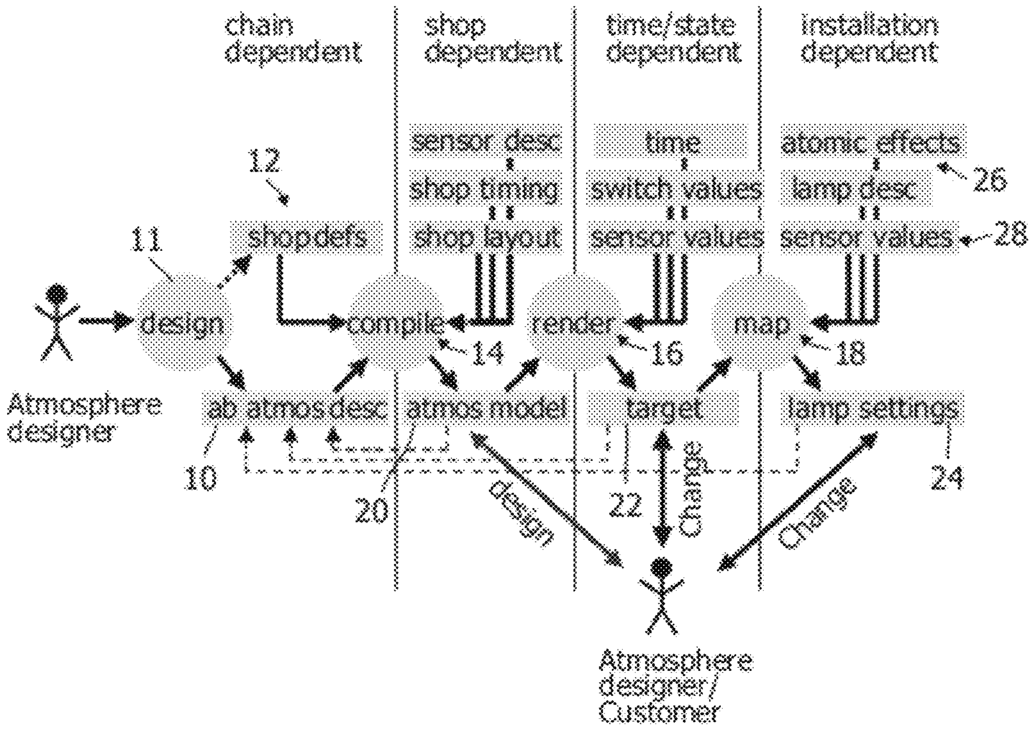
FIG. 1 shows a flow diagram of an embodiment of a method for composing a lighting atmosphere in a shop from an abstract atmosphere description according to the invention.

In the following description, the terms “lighting device”, “lighting unit”, “light unit”, and “lamp” are used as synonyms. These terms mean herein any kind of electrically controllable lighting device such as a semiconductor-based illumination unit such as a LED, a halogen bulb, a fluorescent lamp, a light bulb. Furthermore, (functional) similar or identical elements in the drawings may be denoted with the same reference numerals.

An overview of the flow according to the inventive method for composing a lighting atmosphere from an abstract description for a shop is depicted in FIG. 1. Via some design process 11, for example by using a lighting atmosphere composition computer program with a graphical user interface (GUI), an abstract atmosphere description 10 is created (in FIG. 1 also denoted as ab atmos desc). The abstract atmosphere description can also be generated from one of the interaction methods depicted at the bottom of FIG. 1. The abstract description 10 merely contains descriptions of lighting effect at certain semantic locations at certain semantic times/occasions. The lighting effects are described by the type of light with certain parameters. The abstract description 10 is shop layout and lighting system independent. Thus, it may be created by a lighting designer without knowledge about a specific lighting system and lighting environment such as a room layout. The designer must know only semantic locations of the lighting environment, for example “cash register” or “shoe box 1”, “shoe box 2”, “changing cubicle”, “coat stand” in a shoe or fashion shop. When using a GUI for creating the abstract description 10, it may be for example possible to load a shop layout template containing the semantic locations. Then the designer can create the lighting effects and the atmosphere by for example drag and drop technology from a palette of available lighting devices. The output of the computer program with the GUI may be a XML file containing the abstract description 10.

An example of an XML file containing such an abstract atmosphere description is shown in FIG. 4A to 4C. In the abstract atmosphere description, elements of the light atmosphere description are linked to semantic (functional) locations in the shop. As can be seen in FIG. 4A to 4C, the semantic locations are introduced by the attribute “areaselector”. The lighting atmosphere at this semantic location is introduced by the tag name “lighteffecttype”. The type of light with lighting parameters is described by the tag names “ambient”, “accent”, “architectural” and “wallwash”, as picture by using the tag names “architectural” and “picturewallwash”, or as a lightdistribution. The parameters are described by the attributes “intensity”, for example of 2000 (lux/nit), and “color”, for example x=0.3, y=0.3. In case of a picture wall washing effect the shown picture is specified by the attribute “pngfile” and its intensity. In case of a light distribution, the intensity is specified, the colour at the corners of the area and possibly parameters specifying the s-curve of the gradient. Furthermore, for some lights fading in and out may be specified by the attributes “fadeintime” and “fadeouttime”.

Such an abstract description is automatically translated into control values for the different lighting devices or units, i.e., lamps of a specific instance of a lighting system (in FIG. 1 denominated as lamp settings 24) in three stages:

1. Compiling 14 the abstract description 10 into an atmosphere model 20: In the compile stage 14, the abstract (shop layout and light infrastructure independent) atmosphere description 10 is translated into a shop layout dependent atmosphere description. This implies that the semantic locations 12 are replaced by real locations in the shop (physical locations). This requires at minimum some model of the shop with an indication of the physical locations and for each physical location which semantic meaning it has (e.g. one shop can have more than one cash register. These all have different names, but the same semantics). This information is available in the shop layout. Beside the semantic locations, also semantic notions of time (e.g. opening hours) are replaced by the actual values (e.g. 9:00-18:00). This information is available in the shop timing. Furthermore, for light effects that depend on sensor readings, an abstract sensor is replaced by the (identifier of the) real sensor in the shop. These shop dependent values are contained in a shop definitions file 12 containing specific parameters of the shop and the applied lighting system. The shop definitions contain the vocabulary that can be used in the abstract atmosphere, shop layout and shop timing. The output of the compiler stage is the so called atmosphere model 20 (atmos model), which still contains dynamics, time dependencies and sensor dependencies.

2. Rendering 16 the atmosphere model 20 to a target 22: In the rendering stage, all dynamics, time dependencies and sensor dependencies are removed from the atmosphere model 20. As such, the render stage creates a snapshot of the light atmosphere at a certain point in time and given sensor readings at that point in time. The output of the render stage is called the target 22. The target 22 can consist of one or more view points (see dark room calibration) and per view point a color distribution, an intensity distribution, a CRI (Color Rendering Index) distribution, . . . .
3. Mapping 18 the target 22 into actual control values 24 for lighting devices, i.e. the lamp: The mapping stage converts the target 22 into actual lamp control values 24 (lamp settings). In order to calculate these control values 24, the mapping loops requires:

a. Descriptions of the lamps 26 available in the lighting system, like the type of lamp, color space, . . . .

b. The so-called atomic effects 26 which describe which lamp contributes in what way to the lighting of a certain physical location. How these atomic effects are generated is described below.

c. In case of controlling the lights with a closed feedback loop, the sensor values 28 to measure the generated light.

Based on these inputs 26 and 28 and the target 22, the mapping loop 18 uses an algorithm to control the light units or lamps, respectively, in such a way that the generated light differs as little as possible from the target 22. Various control algorithms can be used, like classical optimization, neural networks, genetic algorithms etc.

As already indicated, the mapping process 18 receives a target light "scene" from the rendering process 16. In order to calculate the lamp settings 24 required to generate light that approximates the target 22 as close as possible, the mapping process 18 needs to know which lamps contribute in what way to the lighting of a certain physical location. This is done by introducing sensors, which can measure the effects of a lighting device or lamp, respectively, in the environment. Typical sensors are photodiodes adapted for measuring the lighting intensity, but also cameras (still picture, video) may be considered as specific examples of such sensors.

In order to achieve an exact mapping result which matches the target 22 as close as possible, a so-called dark room calibration may be done before the abstract atmosphere description 10 is transferred to the actual lamp control settings 24. The process of calibration is done by driving the light units one by one. Cameras and/or sensors will measure the effect of the single light unit on the environment. Each camera or sensor corresponds to one view point. By measuring the effect in this way, influences of wall colors, furniture, carpet etc. are taken into account automatically. Beside measuring the effect of each light unit, it should be indicated which physical locations are measured for every camera and sensor. As far as cameras are concerned, the camera view itself can be used to indicate the physical locations of the shop.

Figure 2:
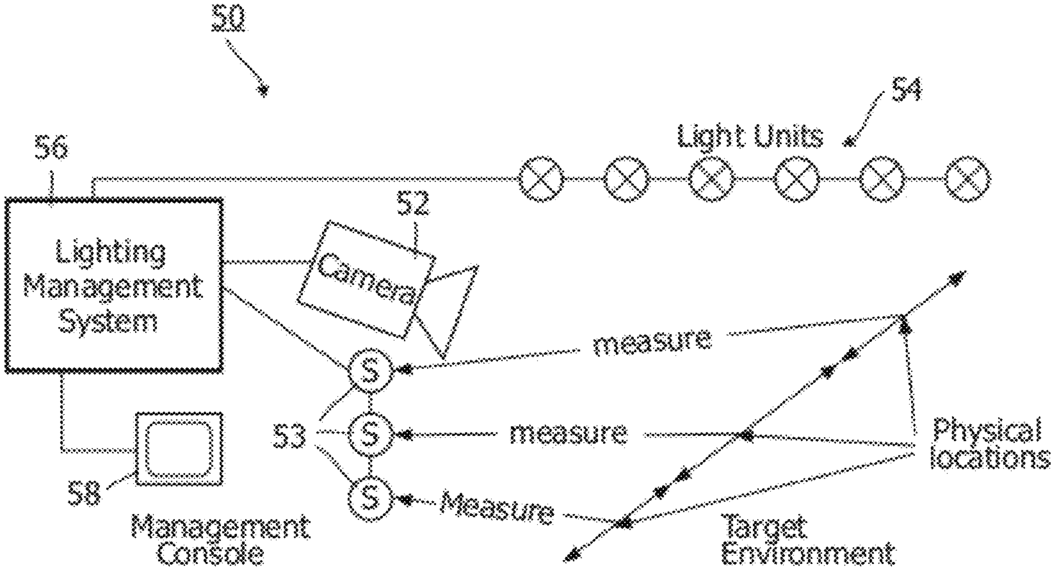
FIG. 2 shows an embodiment of a set up of a lighting system with a camera and sensors for measuring the light created by several lighting devices, wherein the measurements may be processed by a method for composing a lighting atmosphere from an abstract atmosphere description according to the invention.

FIG. 2 shows a possible set up for the calibration of a lighting system 50 with a camera 52 and several sensors 54. The shown lighting system 54 contains:

- Controllable light units 54.
- Several (light) sensors 53 and a camera 52 infrastructure that can measure the effects of lights created by the light units 54 on the environment.
- A lighting management system 56 that can drive the light units 54 and interpret the measurements taken by the camera 52 and the sensors 53. The lighting management system 56 may be implemented by a computer program, executed for example by a Personal Computer (PC).
- A management console 58 that displays the views, and is used for interaction with the installer of the lighting management system 56. Sub areas of the view can be selected and related to physical locations of the target environment. The management console 58 can be located close to the target environment, but also remote from the lighting management system. (e.g. in the chain headquarters). In case of a remote location of the management console 58, the lighting management system 56 is connected to a computer network, such as the internet, in order to allow a remote management via the management console 58.

Figure 3:
FIG. 3 shows a picture of a real shop and certain physical locations in the shop indicated in the picture with a pointing device of a computer as it may be used to define physical locations of a specific instance of a lighting system for processing by a method for composing a lighting atmosphere from an abstract atmosphere description according to the invention.

The different views on the environment are displayed on the management console 58. In these views, the installer indicates the physical locations e.g. with a pointing device (mouse, tablet). This is illustrated in FIG. 3 which shows a picture of a real shop and certain physical locations (shoebox1, shoebox2, isleX) in the shop indicated in the picture by an installer on the management console 58.

During dark room calibration, the effects of the light units 54 on the environment and thus the physical locations are measured. In the dark room calibration procedure, the effects of the different light units 54 are tested in conditions which are constant and measurable. The best conditions are those where daylight is at minimum (e.g. at night, with closed blinds). The calibration process comprises essentially the following steps:

- First, the light management system 56 turns all the light units 54 off, and measures the lighting effects that are present. These will be subtracted from the measured effects of the lights later on. In dark room conditions, this background effect is nihil or very small.
- Then light units 54 are driven one by one, a representative set of control values is used. This control set shows the features of the light units 54 one by one. For every light unit 54 and control setting, the effect on the environment is described and stored (atomic effect).

The atomic effects are then used to realize the effects in the lighting design.

Figure 5:
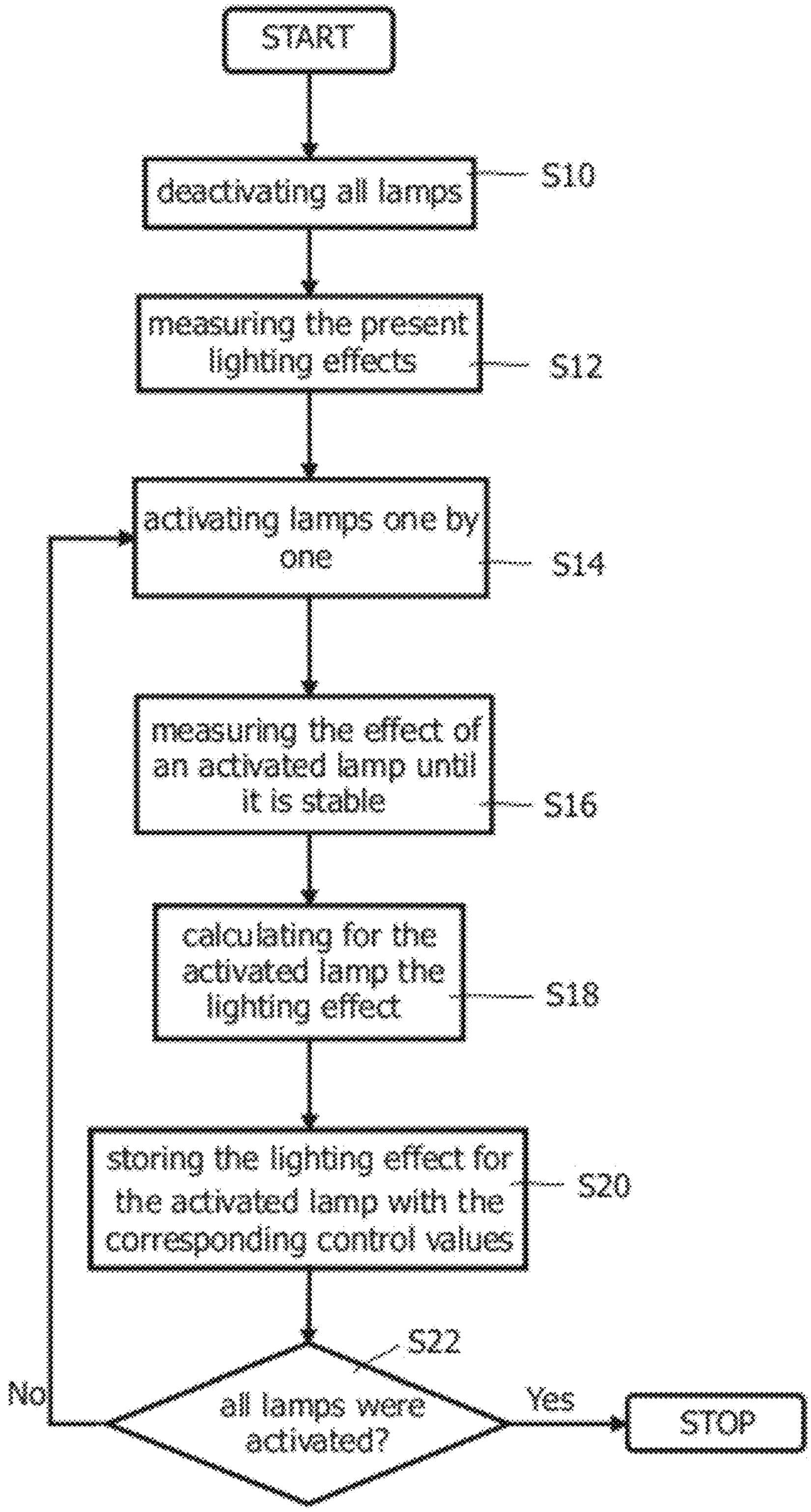
FIG. 5 shows a detailed sequence of steps of an embodiment of a calibration process for a lighting system according to the invention.

The detailed sequence of steps of the calibration process is shown in FIG. 5. In step S10, all lamps are deactivated, i.e. switched off. Then, in step S12 the present lighting effects are measured and the measurement values are stored as dark light values. Afterwards, the lamps of the lighting system are activated, i.e. switched on one by one by using a representative set of control values for the lamps (step S14). The effect of each lamps is measured at several different physical locations in step S16 until it is stable. In the following step S18, for every lamps the lighting effect on the environment is calculated by subtracting the stored dark light values from the stable measurement values of the effect of each lamps. In step S20, the lighting effect for the representative set of control values for each lamps is stored. In step S22, it is checked whether all lamps were already activated. If yes, the calibration process stops. If no, the process returns to step S14.

If the same physical location appears in two view points, the measurements for the light effects in the views are compared and matched. Differences can have several reasons: e.g. the lamp provides ambient white light and the views are orthogonal so they have a different background, with maybe different colors. In such a case, the installer is triggered and has to select or describe the atomic effect via user interaction.

When light units are added to the calibrated system, a service discovery protocol may detect them, and the lighting management system asks for features of the lamps. Representative control sets are generated, and a dark room calibration (only for these light units) can be started on demand or automatically.

Figure 6:
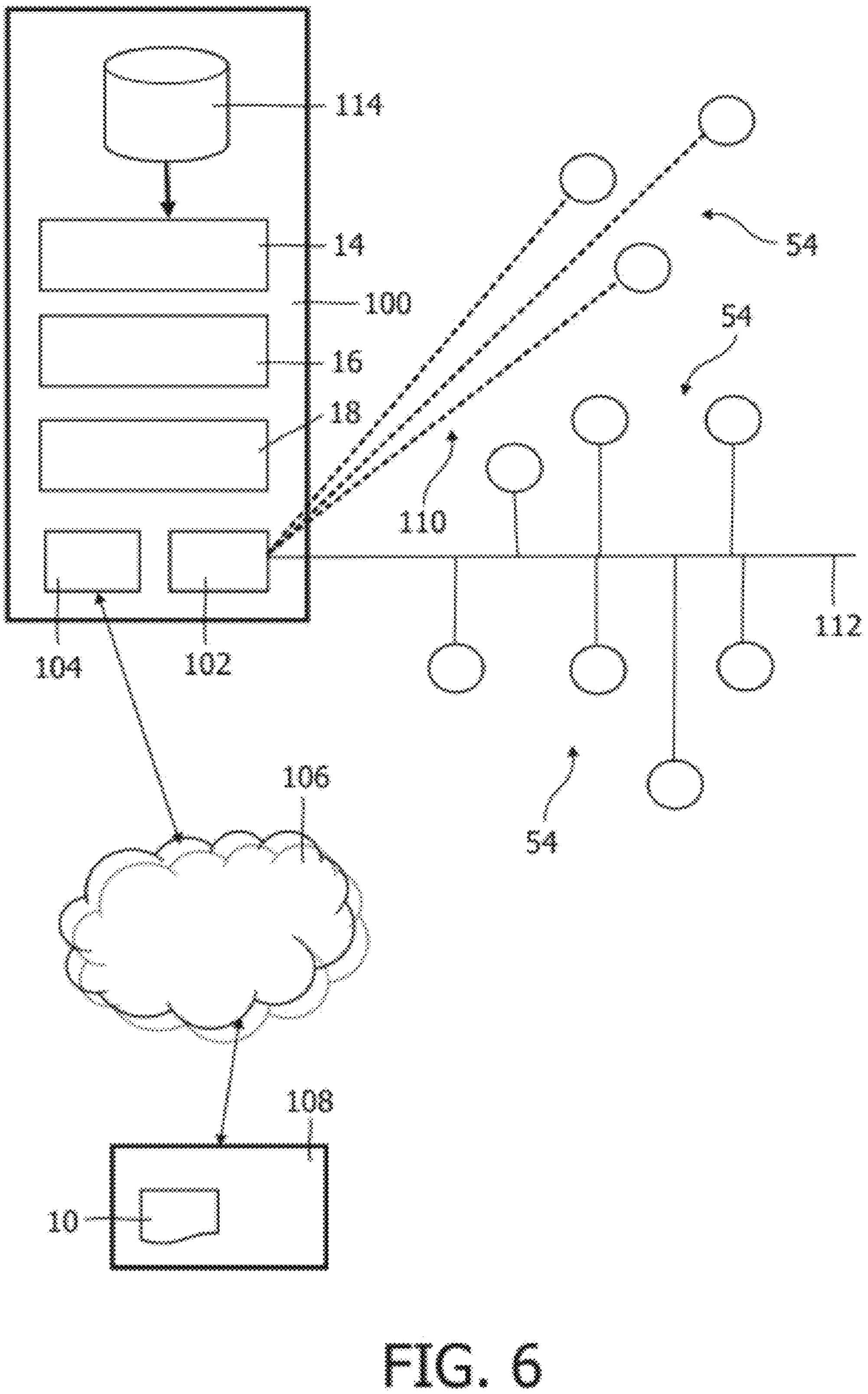
FIG. 6 shows an embodiment of a device for composing a lighting atmosphere from an abstract atmosphere description according to the invention, wherein the abstract description is stored on a server computer in the internet for downloading by the device.

FIG. 6 shows a device for composing a lighting atmosphere from an abstract atmosphere description implemented by a PC 100 which executes a computer program which comprises a lighting atmosphere composition compiling module 14, a lighting atmosphere composition rendering module 16, and a lighting atmosphere composition mapping module 18. The PC 100 further comprises an interface 102 for communication with a lighting system containing several lighting units 54. The interface 102 is adapted to communicate with the lighting units 54 via a communication bus 112 and RF communication connections 110. The PC 100 transmits control values or settings over the communication connections 110 and 112 to the lighting units 54 in order to adjust them, particularly their lighting intensities and colors. Finally the PC 100 contains receiving means 104 adapted for receiving an abstract atmosphere description 10 from a server computer 108 over the internet 106. The receiving means 104 are adapted to establish a communication connection over the internet 106 with the server computer 108, for example periodically or on demand, and to download an abstract atmosphere description 10 from the server computer 108. The receiving means 104 may be further adapted to check whether an updated abstract atmosphere description 10 is available on the server computer 108 and to download it automatically. Thus, the chain headquarters can for example update the lighting atmosphere for their shops centrally and to upload a corresponding abstract atmosphere description 10 to the server computer 108. It is also possible that the receiving means 104 are adapted to allow a remote login from the server computer 108 in order to upload the abstract atmosphere settings 10 to the PC 100.

The downloaded or uploaded abstract atmosphere description 10 is processed in the PC 100 in order to obtain a set of control values that may be communicated to the lighting units 54 over the connections 110 and 112. The task of processing the description 10 is performed by the different software modules 14, 16, and 18. Thus, the lighting atmosphere composition compiling module 14 is adapted for compiling the abstract atmosphere description 10 into an atmosphere model comprising a room layout dependent and lighting infrastructure independent description. The module 14 loads the room layout (shop layout), the shop specific timing information (shop timing) and infrastructure specific data and parameters from a database 114 in the PC 100. Then the atmosphere model is rendered to a target by removing of dynamics, time and sensor dependencies from the atmosphere model and creating a snapshot of the lighting atmosphere at a certain point in time and given sensor readings at the certain point in time by the lighting atmosphere composition rendering module 16. Finally, the lighting atmosphere composition mapping module 18 maps the target into actual control values for the lighting units 54 of the lighting system which are transmitted to the lighting units 54 via the communication connections 110 and 112.

The invention can be used in (relatively large) lighting systems that are used for effect as well as functional lighting. An important feature of the invention is, that light scenes or atmospheres only have to be described once e.g. for a complete shop chain. Automatic rendering on the local situation enables uniform lighting over the complete chain. Because of the room and lighting infrastructure independence of the light description, it can also be used in service models. For instance, a service provider can offer light scenes without requiring precise knowledge on the layout or lighting system on which the light scene has to be rendered. Only information on the typical semantic locations is required.

The invention has the main advantage that it allows to create light scenes and lighting atmospheres at a high level of abstraction without requiring the definition of a lighting atmosphere or scene by setting the intensity, color, etc. for single lighting units or devices (or groups) which can be very time consuming and cumbersome, particularly with large and complex lighting systems comprising many lighting devices. In other words, the abstract atmosphere description is room and lighting infrastructure independent, thus allowing to use one lighting description at many different rooms or lighting infrastructures. Particularly, the invention allows to describe lighting atmospheres and scenes by describing the type of light, for example diffuse ambient lighting, focused accent lighting, wall washing, etc. and certain lighting parameters such as the intensity, color, color gradient which are desired at certain semantic locations, for example at the cash register of a shop at a certain time or occasion. This abstract description may be automatically rendered to a specific instance of a room and lighting system. In order to achieve good results of the process of automatically rendering, the invention provides a calibration function.

At least some of the functionality of the invention such as transferring the abstract atmosphere description to a specific instance of a lighting system may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method for composing a lighting atmosphere from an abstract atmosphere description comprising the acts of:

providing the abstract atmosphere description of the lighting atmosphere by describing the type of light with certain lighting parameters desired at certain semantic locations at certain semantic times, wherein a semantic location is a description of a location and a semantic time is a description of a time, transferring the abstract atmosphere description to a specific instance of a lighting system;

compiling the abstract atmosphere description into an atmosphere model comprising a room layout dependent and lighting infrastructure independent description;

replacing the certain semantic locations in the abstract description with physical locations in the room;

replacing the certain semantic times in the abstract description with actual times; and/or replacing any semantic sensors in the abstract description with real sensors located in the room;

rendering the atmosphere model to a target by removing of dynamics, time and switch or sensor dependencies from the atmosphere model and creating a snapshot of the lighting atmosphere at a certain point in time and given sensor readings at the certain point in time;

mapping the target into actual control values for lighting devices of the specific instance of a lighting system;

receiving parameters of the lighting devices and contributions of the lighting devices to a lighting at a certain physical location, calculating the actual control values for the lighting devices based on the received parameters and contributions and the target;

receiving sensor values;

controlling the lighting devices with a closed feedback loop or an open loop control based on the received sensor values.

2. The method of claim 1, further comprising the act of:

calibrating the lighting system before transferring the abstract atmosphere description to a specific instance of a lighting system.

3. The method of claim 2, wherein the calibrating act comprises the following acts:

deactivating all lighting devices, measuring the present lighting effects and storing the measurement values as dark light values, activating lighting devices of the lighting system one by one by using a representative set of control values for the lighting devices, waiting until the light effect of each activated lighting device is stable, measuring the effect of each lighting device at several different physical locations, calculating for every lighting device the lighting effect on the environment by subtracting the stored dark light values from the measurement values of the effect of each lighting device, and storing the calculated lighting effect together with the corresponding control values for each lighting device.

* * * * *